United States Patent
Lopez

(10) Patent No.: US 10,156,899 B2
(45) Date of Patent: Dec. 18, 2018

(54) DYNAMIC CAMERA OR LIGHT OPERATION

(71) Applicant: Facebook, Inc., Menlo Park, CA (US)

(72) Inventor: Javier San Agustin Lopez, Copenhagen (DK)

(73) Assignee: Facebook, Inc., Menlo Park, CA (US)

(*) Notice: Subject to any disclaimer, the term of this patent is extended or adjusted under 35 U.S.C. 154(b) by 219 days.

(21) Appl. No.: 14/990,448

(22) Filed: Jan. 7, 2016

(65) Prior Publication Data

US 2016/0195927 A1   Jul. 7, 2016

Related U.S. Application Data

(60) Provisional application No. 62/100,721, filed on Jan. 7, 2015.

(51) Int. Cl.
  *G06F 3/01* (2006.01)
  *H04N 5/225* (2006.01)
  *H04N 5/235* (2006.01)

(52) U.S. Cl.
  CPC .......... *G06F 3/013* (2013.01); *H04N 5/2256* (2013.01); *H04N 5/2354* (2013.01)

(58) Field of Classification Search
  None
  See application file for complete search history.

(56) References Cited

U.S. PATENT DOCUMENTS

| | | |
|---|---|---|
| 5,686,881 A | 11/1997 | Ridout |
| 7,856,214 B2 | 12/2010 | Rapisarda |
| 8,976,110 B2 | 3/2015 | Eskilsson et al. |
| 9,185,352 B1 | 11/2015 | Jacques |
| 2007/0181692 A1* | 8/2007 | Barkan ............ G06K 7/10722 235/462.41 |
| 2009/0262214 A1 | 10/2009 | Hsieh |
| 2013/0335302 A1 | 12/2013 | Crane et al. |
| 2014/0132508 A1* | 5/2014 | Hodge ................ G06F 3/013 345/156 |
| 2014/0320665 A1* | 10/2014 | Feldman ............ G01D 4/008 348/160 |
| 2015/0251584 A1* | 9/2015 | Deyaf ................ H04B 5/0037 307/10.8 |
| 2015/0346815 A1* | 12/2015 | Horesh ................ G06F 3/013 345/174 |

OTHER PUBLICATIONS

PCT International Search Report and Written Opinion, PCT Application No. PCT/EP2016/000017, dated Apr. 19, 2016, 12 pages.

* cited by examiner

*Primary Examiner* — Kaitlin A Retallick
(74) *Attorney, Agent, or Firm* — Fenwick & West LLP

(57) ABSTRACT

A user of a computing device may interact with the computing device through the user's eye movement. An image of the user's eyes or face, captured by a camera on the computing device, may be analyzed using computer-vision algorithms, such as eye tracking and gaze detection algorithms. During use of the computing device, one or more lights illuminating the user, or cameras viewing the user, may become blocked. The device may be equipped with more lights or cameras than are necessary to perform gaze detection by the device. In an over-equipped device, the additional lights or cameras can remain dormant until a blockage is detected. In response to a camera or light becoming blocked, a dormant light or camera can be activated.

18 Claims, 10 Drawing Sheets

DYNAMIC CAMERA OR LIGHT OPERATION

PRIORITY CLAIM

The application claims priority to U.S. Provisional Patent Application No. 62/100,721, filed Jan. 7, 2015, entitled "Dynamic Camera or Light Operation," which is incorporated herein by reference in its entirety.

TECHNICAL FIELD

The present disclosure generally relates to user interfaces and controls that utilize eye tracking and, more specifically, to systems and methods for adjusting light-emitting diode (LED) output or camera input during use of an eye tracking system.

BACKGROUND

A gaze of a user may be determined using eye tracking technology that determines the location of the user's gaze based on eye information present in images of the user's eyes or face. Poor lighting or image quality may contribute to erroneous eye tracking.

BRIEF DESCRIPTION OF THE DRAWINGS

Some example embodiments are illustrated by way of example and not of limitation in the figures of the accompanying drawings.

DETAILED DESCRIPTION

Example systems and methods for dynamic camera or LED operation are described. In the following description, for purposes of explanation, numerous specific details are set forth in order to provide a thorough understanding of example embodiments. It will be evident, however, to one skilled in the art that the present technology may be practiced without these specific details.

A user of a computing device may interact with—and control objects and applications displayed on—the computing device through the user's eye movement. An image of the user's eyes or face, captured by a camera on the computing device or on a device coupled to the computing device, may be analyzed using computer-vision algorithms, such as eye tracking and gaze detection algorithms. The computing device may then use the extracted information to determine the location and orientation of the user's eyes and estimate a gaze location of the user. The gaze location of a user is an estimation of where the user is looking (e.g., a location in three-dimensional (3-D) space relative to the user and at which the user is looking) and may include information such as a user's line of sight, point of regard, the depth of convergence of the user's gaze, or any suitable combination thereof. To facilitate capture of the image, lights (e.g., LEDs) controlled by the device may be used to illuminate the user's face. For example, the captured images may be processed to extract information relating to features of the user's eyes or face.

During use of the computing device, events may occur that affect the quality of images received by the gaze detector. For example, one or more lights illuminating the user may become blocked, thereby reducing the quality of captured images of the user's eyes. As another example, one or more cameras capturing images of the user may become blocked, reducing the amount of data available to the gaze detector.

The blocking of a light or camera may be detected through the use of a proximity sensor near the light or camera, through a light sensor near the light or camera, through analysis of one or more images captured by one or more cameras, or any suitable combination thereof. The device may be equipped with more lights or cameras than are necessary to perform eye tracking. For example, two lights and one camera may be required to perform eye tracking on a particular device, but the device may be equipped with four lights and two cameras. In an over-equipped device, the additional lights or cameras can remain dormant until a blockage is detected. For instance, the system may detect that the light from a particular light source does not reach the user's eyes. In response to a camera or light becoming blocked, a dormant light or camera can be activated. In this way, the loss of gaze detection quality can be partially or wholly mitigated.

Figure 1:
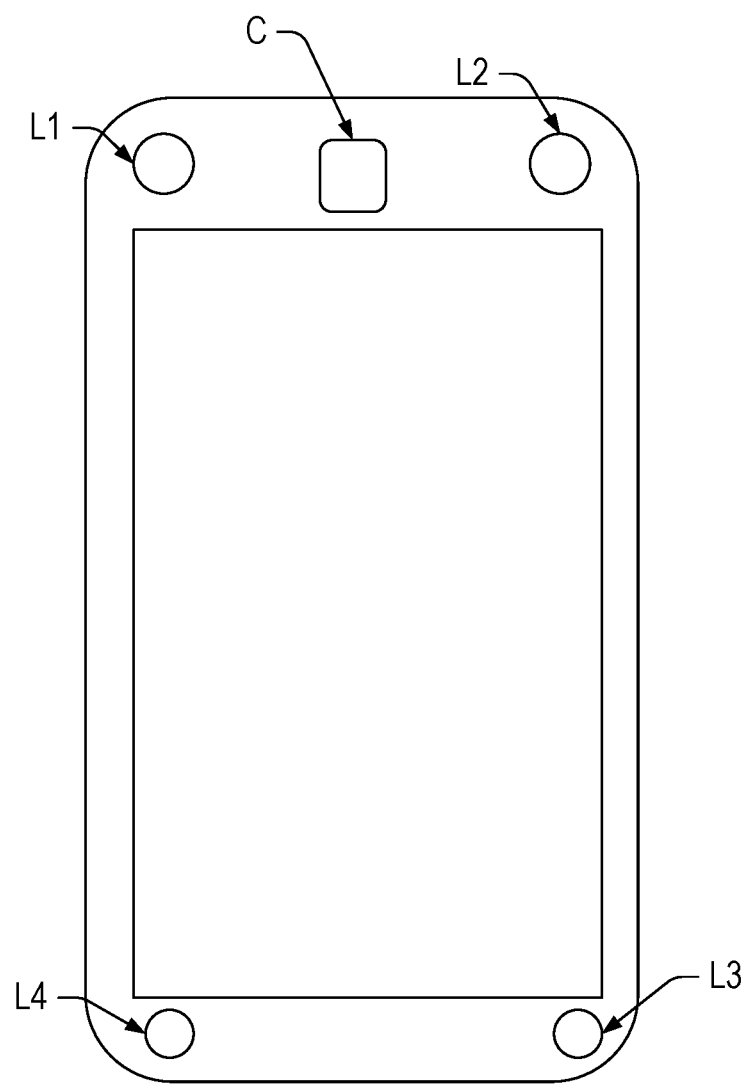
FIG. 1 is a device diagram of an example computing device capable of dynamic camera or LED operation, according to some example embodiments.

FIG. 1 is a device diagram of an example computing device capable of facilitating eye tracking control and adjusting light output or camera input during use of an eye tracking system. While eye tracking control is described throughout the description, one of ordinary skill in the art will appreciate that the example computing device may be used passively to record the eye movement of a user without the user controlling the computing device with the eyes (e.g., to facilitate a usability study or to determine the drowsiness level of a driver in a vehicle). Eye tracking control refers to the control of a device, or software running on a device, based on tracking the eye activity of a user. For example, based on the position or motion of a user's eyes, objects on a screen can be moved, text can be input, user interfaces can be interacted with, and so on.

The computing device may be any type of computing device, including, but not limited to, a smart phone, a personal digital assistant (PDA), a mobile phone, a computing tablet, an electronic reader, a television, a laptop, a desktop computer, a display device, a head-mounted display, a virtual reality headset, an augmented reality headset, and the like. In some example embodiments, the computing device is integrated into or mounted in a vehicle (e.g., a car, boat, or aircraft) or appliance (e.g. a refrigerator, a television, a gaming console, and the like). During eye tracking control, the computing device may be used by the user by holding the computing device with one hand, both hands, while the computing device is on a stand or resting on a surface, or while the computing device is mounted on the user's head.

The computing device may include a camera C and one or more LEDs. In the example of FIG. 1, four LEDs L1-L4 are represented. For explanatory purposes, the discussion herein will continue to refer to the LEDs L1-L4. However, any appropriate light-emitting source may be used (e.g., an infrared (IR) laser) in place of one or more of the LEDs L1-L4.

The computing device may include any number of LEDs L1-L4 (e.g., IR LEDs) that may be placed in a suitable location in any manner within the computing device. In some example embodiments, the one or more LEDs may be synchronized with the one or more cameras in such a manner that one or more of the LEDs are turned on when one or more of the cameras are grabbing a frame and turned off otherwise. In some example embodiments, the LEDs may be turned off if no movement has been detected within a predetermined period of time or if the computing device goes into a sleep mode.

The eye tracking control software may analyze the images taken by the camera C to provide coordinates (x, y, z or x, y) relative to the screen indicating where the user is looking on the display of the computing device. These coordinates may be used for any number of applications (e.g., scrolling, moving objects, selecting icons, playing games, collecting data for analysis, etc.).

Figure 2:
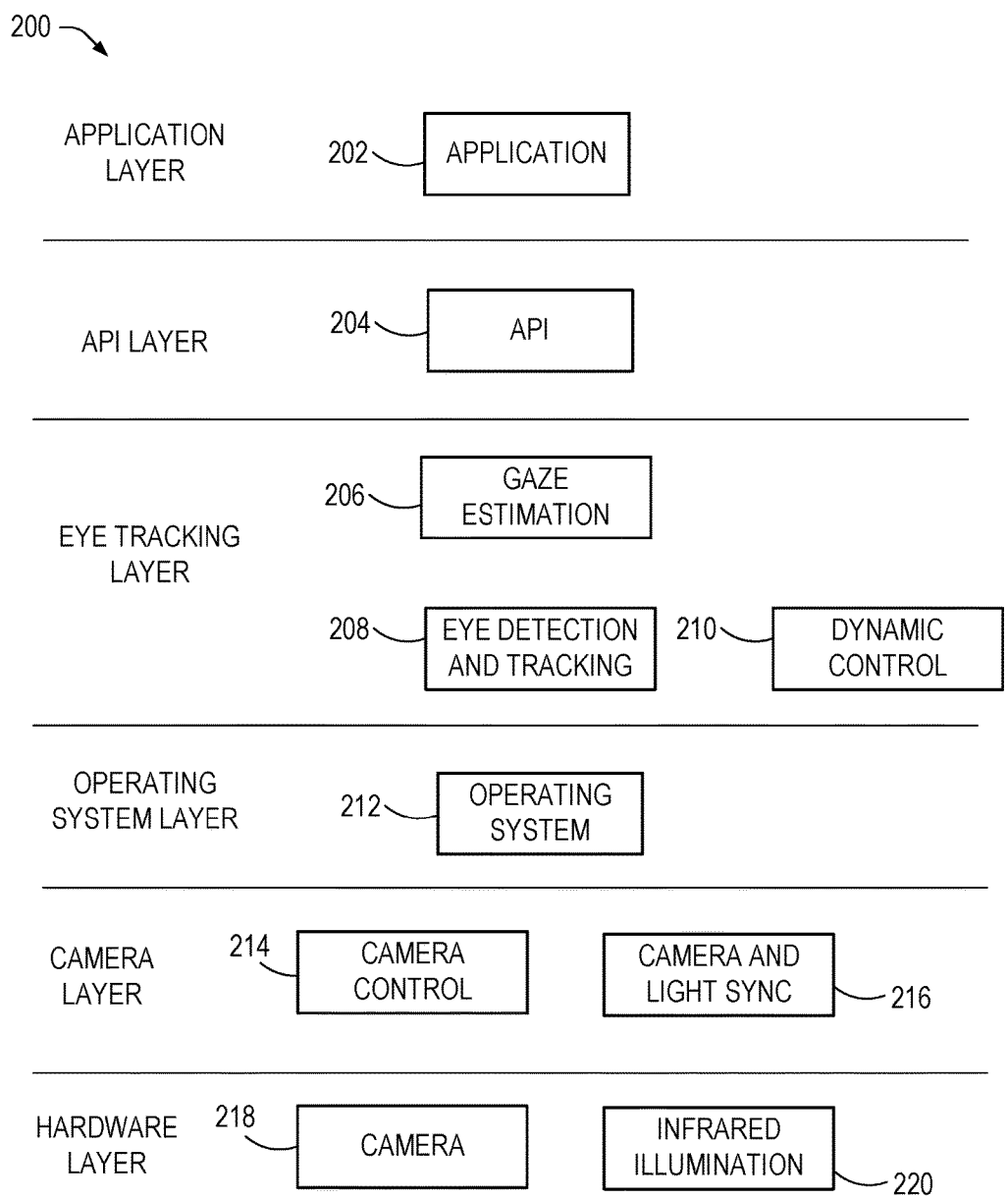
FIG. 2 is a block diagram of an example system architecture for dynamic camera or LED operation, according to some example embodiments.

FIG. 2 is a block diagram of an example system architecture 200 for facilitating eye tracking control and calibration thereof. Any one or more of the components 202-220 of the system architecture 200 may be implemented using hardware modules (e.g., a properly-configured central processing unit (CPU) of the computing device or a combination of a CPU and a graphics processing unit (GPU) of the computing device). In some example embodiments, any one or more of the components 202-220 of the system architecture 200 may include software running on a dedicated chip. The software may run as a background process (e.g. as part of the operating system (OS), in a web browser, etc.) and may provide an application programming interface (API) 204 that other applications can access. The API 204 may send an alert (e.g., raise an event) or use some other similar mechanism to send the gaze information to other applications.

The system architecture 200 may be divided into different layers. The hardware layer may include a camera module 218 and an infrared illumination module 220 that may correspond to the respective hardware (e.g. the camera, the infrared illumination, etc.). A camera layer may include a camera control module 214 that may be in charge of communicating with the one or more cameras in order to perform camera operations such as, for example, starting the camera, grabbing images, controlling the camera properties, and the like. This layer may also include a camera and light sync module 216, which may synchronize the one or more cameras and the infrared emitters so that the lights are controlled by the eye tracking software in order to improve tracking of the user's eyes and minimize energy consumption. In some example embodiments, the camera layer may be configured to strobe the infrared LEDs at the frequency of the camera trigger output.

The camera layer may deliver images to the eye tracking layer. In the eye tracking layer, an eye detection and tracking module 208 may process images to find features like face location, eye region location, pupil center, pupil size, location of the corneal reflections, eye corners, iris center, iris size, and the like. The features may be used to determine different user metrics (e.g., the drowsiness of a driver in a vehicle). Furthermore, these features may be used by a gaze estimation module 206 in the gaze estimation stage, which may be in charge of calculating the point of regard or the line of sight of the user using the features computed by the eye detection and tracking module 208. The point of regard of the user may be a location on the display where the user is looking, a location on another plane where the user is looking, a three-dimensional point where the user is looking, or a plane where the user is looking. The gaze estimation module 206 may also calculate specific features of the user's eyes, such as optical and visual axes, locations of the cornea center and pupil in 3D space, and the like. These features may also be employed to compute the point of regard on a given display or plane.

The dynamic control module 210 processes sensor information to detect blocked lights or cameras and cause an appropriate reaction. For example, the eye detection and tracking module 208 may determine that a glint corresponding to a light has vanished. The dynamic control module 210 may respond to the vanishing of the glint by deactivating the corresponding light, selecting another deactivated light and, via the infrared illumination module 220, activating it. As another example, a proximity sensor near a camera may detect that the camera has been covered. Responsive to the sensor, the dynamic control module 210 can select a deactivated camera and activate it via the camera control module 214 or the camera module 218.

The API layer may be used for communication between the eye tracking layer and applications 202 that use eye gaze information (e.g., the OS layer or games that employ eye gaze information). Though the OS 212 is shown in FIG. 2 as intermediating between the eye tracking layer and the camera layer, in some example embodiments, the relative positions are reversed and the eye tracking layer intermediates between the OS 212 and the camera layer. An API module 204 may send data calculated by the eye tracking layer, such as coordinates of the point of regard, 3-D location of the user's eyes, pupil size, distance between the eyes, head orientation, head movement, and the like. The API module 204 may also accept commands from an application to the eye tracking layer (e.g., to start or stop the eye tracking engine, query for specific information, inform the engine of the location and size of visual elements the user may look at, or any suitable combination thereof). An application module 202 and the OS 212 may connect to the eye tracker's API module 204 and use eye gaze information for any suitable purpose (e.g., control an application or a game, record eye data for visual behavior studies, adjust the transparency of information on a screen, or any suitable combination thereof).

Figure 3:
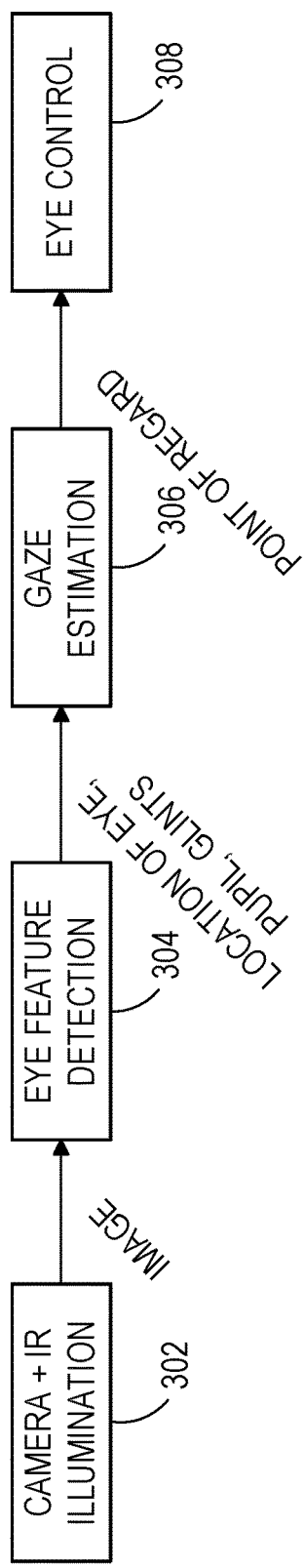
FIG. 3 is a block diagram of an example flow of data used in dynamic eye tracking calibration, according to some example embodiments.

FIG. 3 is a block diagram of an example flow of data used to facilitate eye tracking control and calibration thereof. The camera and infrared illumination module 302 may capture an image of the user (e.g., take a photograph of the user's face or one or both eyes) using one or more cameras, ambient light, emitted visible light, emitted infrared light, or any suitable combination thereof. The eye feature detection module 304 may use the captured image data to detect eye features (e.g., location and orientation of eyes, pupils, irises, corneal reflections, or any suitable combination thereof).

Using the detected eye features, the gaze estimation module 306 may estimate the user's point of regard or line of sight, which may then be used to control aspects of an application through the eye control module 308.

Figure 4A:
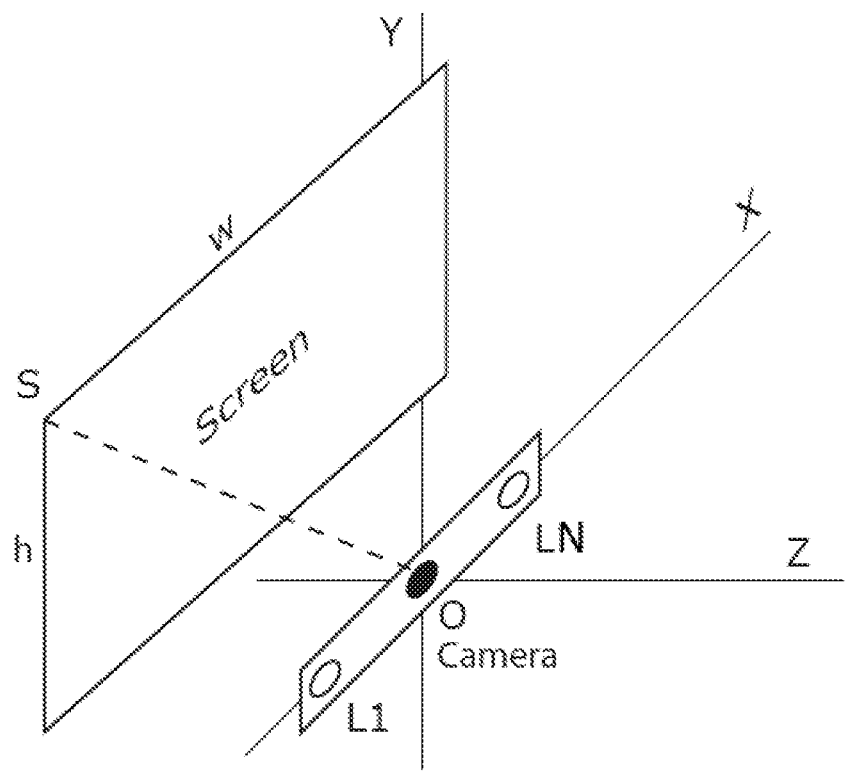
FIGS. 4A-4B are schematic diagrams depicting eye tracking technology relative to a display, according to some embodiments.
Figure 4B:
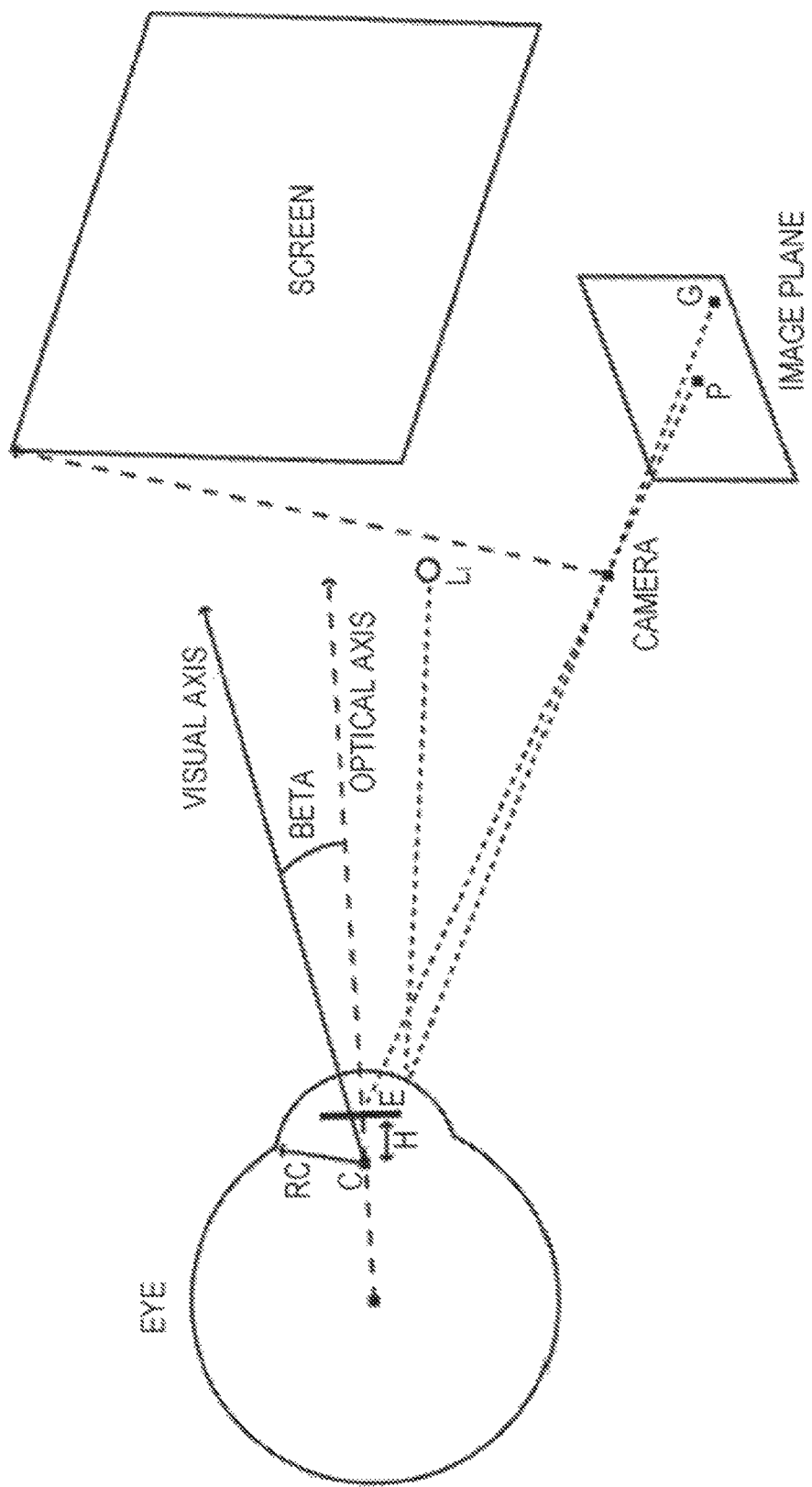

FIGS. 4A and 4B are schematic diagrams depicting eye tracking technology relative to a display. In FIG. 4A, O is the center of the coordinate system XYZ, and $Li_{1-n}$ are light sources. In some embodiments, the location of the one or more cameras and the one or more light sources $Li_{1-n}$ with respect to O is known. In some embodiments, the location of the screen S with respect to O is known. In some embodiments, some camera parameters are known, including focal length, optical center, and the like. Using the known parameters, the unknown values can be determined.

In some embodiments, an eye tracking system is built into a screen or is mounted in a specific location on the screen, as described above. In some other embodiments, the components of the eye tracking system (e.g., the one or more cameras and the one or more light sources) are integrated into another element such as a car dashboard, a head mounted display, a virtual reality headset, or a helmet.

The eye tracking system may capture information regarding the eye and face features of the user, including pupil center, pupil ellipse, corneal reflections, eye corners, face orientation, and the like. The pupil center is the point at the center of the detected pupil. A pupil ellipse is the elliptical representation in an image of a (circular) pupil. The eccentricity of the pupil ellipse is related to the angle between the direction of the user's gaze and the line from the camera to the eye. Corneal reflections are reflected light from the cornea. When the relationship between the light source L and the camera O is known, the position of corneal reflections of the light source, as measured relative to the pupil center, can be used to identify the gaze direction. When the relationship between the light source L and the camera O is not known, the user's point of regard may be computed using non-hardware-calibrated techniques, such as interpolation methods, methods based on cross-ratios, or any suitable combination thereof.

FIG. 4B illustrates eye features to be calculated in 3-D space with respect to the origin O such that the visual axis may be computed and intersected with the display plane. The location of the corneal reflections on the image plane, G, can be used in combination with the location of the light sources in 3-D space, L, with respect to the one or more cameras and the intrinsic parameters of the cameras to calculate the location of the cornea center in 3-D space, C. For example, a ray can be traced from each light source L to each camera via the cornea. Each light source camera pair provides a separate ray and identifies a point on the surface of the cornea. By triangulating between these points, both the corneal radius and the location of C can be determined. When more cameras or light sources are used, the accuracy of the measurement can be increased.

The location of the pupil center on the image plane, p, can be used in combination with the location of the cornea center in 3-D space, C, the optical properties of the eye and air, and the intrinsic parameters of the cameras to calculate the location of the pupil center in 3-D space, E. For example, the camera captures an image of the pupil, but the actual position of the center of the cornea differs from the position directly indicated by the image because the pupil lies behind the cornea and light is refracted at the juncture between the cornea and the air. Accordingly, the apparent position of the pupil center is adjusted to take this refraction into account.

The location of the pupil center E and the location of the cornea center C in 3-D space define a vector, called the optical axis. The actual line of sight, which may also be known as visual axis, has an angular offset with respect to the optical axis, known as alpha and beta, which are usually around 5° horizontally and 1.5° vertically. Alpha and beta may take different values for each person and therefore may be computed on a per-user basis.

Both alpha and beta can be computed via a calibration process, which may take place explicitly or implicitly while the user is interacting with certain visual elements on a computing device.

Once the visual axis is known, the ray can be intersected with the screen plane. The intersection provides the on-screen gaze coordinates where the user is looking. Other eye parameters like the corneal radius or the distance between the pupil center and corneal center can also be calculated during the user calibration process to improve the accuracy of the computation of on-screen gaze coordinates (due to a better estimation of the cornea center and hence optical and visual axes). Otherwise, average values can be used (e.g., 7.8 mm for the corneal radius).

The total set of unknowns to be calibrated during said user calibration may include any unknown information, such as eye parameters (e.g., offset between optical and visual axes alpha and beta, corneal radius RC, distance between pupil center and cornea center H, refraction indices n, etc.) and hardware parameters (e.g., screen location and orientation with respect to location of eye tracking device in 3-D space S, and screen size (width w, height h)). The information known prior to calibration may include a location of a light source with respect to the one or more cameras $L_1$-$L_n$, camera parameters of the one or more cameras (e.g., focal length, optical center, etc.), and the like.

In some example embodiments, the screen size (w, h) may be known or may be obtained programmatically through software (e.g., through an operating system API) and used as prior known information. In some embodiments, some of the eye parameters may take constant values to reduce the dimensional space of the unknowns.

Figure 5:
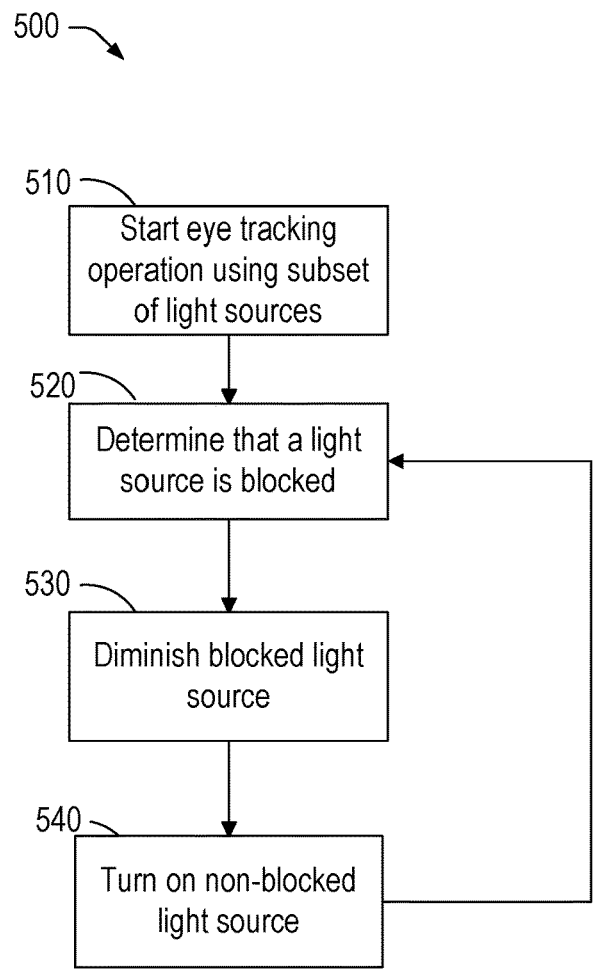
FIG. 5 is a flowchart of an example process of dynamic LED operation, according to some example embodiments.

FIG. 5 is a flowchart of an example process 500 of dynamic LED operation, according to some example embodiments. Operations 510-540 of the process 500 are described as being performed by the components or modules shown in FIG. 2, by way of example and not limitation.

In operation 510, eye tracking is begun using a subset of the light sources on a device. For example, L3 and L4 of FIG. 1 may be enabled by the infrared illumination module 220.

During use of the device, the dynamic control module 210 may detect that one of the enabled lights is blocked, in operation 520. For example, the user holding the device 100 may place a thumb over L3, detected by a proximity sensor in the device immediately adjacent to L3. As another example, the user may be wearing glasses and the frame of the glasses may block the light emitted from L3. The system may detect this situation by analyzing an image captured by the camera.

The dynamic control module 210, in operation 530, diminishes the blocked light. Continuing with this example, the light L3 is diminished. Diminishing the light may reduce power consumption, reduce heat generation, or both. In some example embodiments, diminishing the light L3 is accomplished by turning the light L3 off completely, by reducing the intensity of the light L3, by reducing a strobing frequency of the light L3, or any suitable combination thereof.

In operation 540, the dynamic control module 210 activates a non-blocked light. The available lights may be prioritized as substitutes for each other. For example, L3, in the lower-right corner of the device may have L2 (upper-right) as a first substitute, L4 (lower-left) as a second substitute, and L1 (upper-left) as a third substitute. In this case, since L4 is already on, L2 would be selected as a substitute for the blocked L3. If L2 is also blocked, L1 would be selected.

In some example embodiments, lights are treated in pairs or larger sets. For example, lights L3 and L4 may form one pair and lights L1 and L2 may form another pair. When either L3 or L4 is blocked, both L3 and L4 are disabled and both L1 and L2 are enabled. For paired lights, treating lights individually may be a fallback position. For example, beginning from the configuration with L3 and L4 on and L1 and L2 off, when L3 is blocked, a check is made to see if both L1 and L2 are available. If they are, L3 and L4 are disabled and L1 and L2 are enabled. If neither pair is unblocked (e.g., L3 and L2 are blocked), then individual lights L4 and L1 may be used (e.g., because L1 is the highest-priority unblocked substitute for L3).

The priority for each light may be computed based on a number of metrics (e.g., the location of each light, the orientation of the device, the relative orientation of the user with respect to the device, the probability of each light of being obstructed, the quality of the tracking, the accuracy of the gaze estimates, the noise in the image, or any suitable combination thereof). The priorities may be updated as the user uses the device. For instance, if the user is using the device in portrait mode and rotates it 90 degrees to use it in landscape mode, the priority of each light may be updated.

The process of monitoring for blocked lights may continue during operation of the device, represented in FIG. 5 by the control flow returning to operation 520 after operation 540 is complete.

Figure 6:
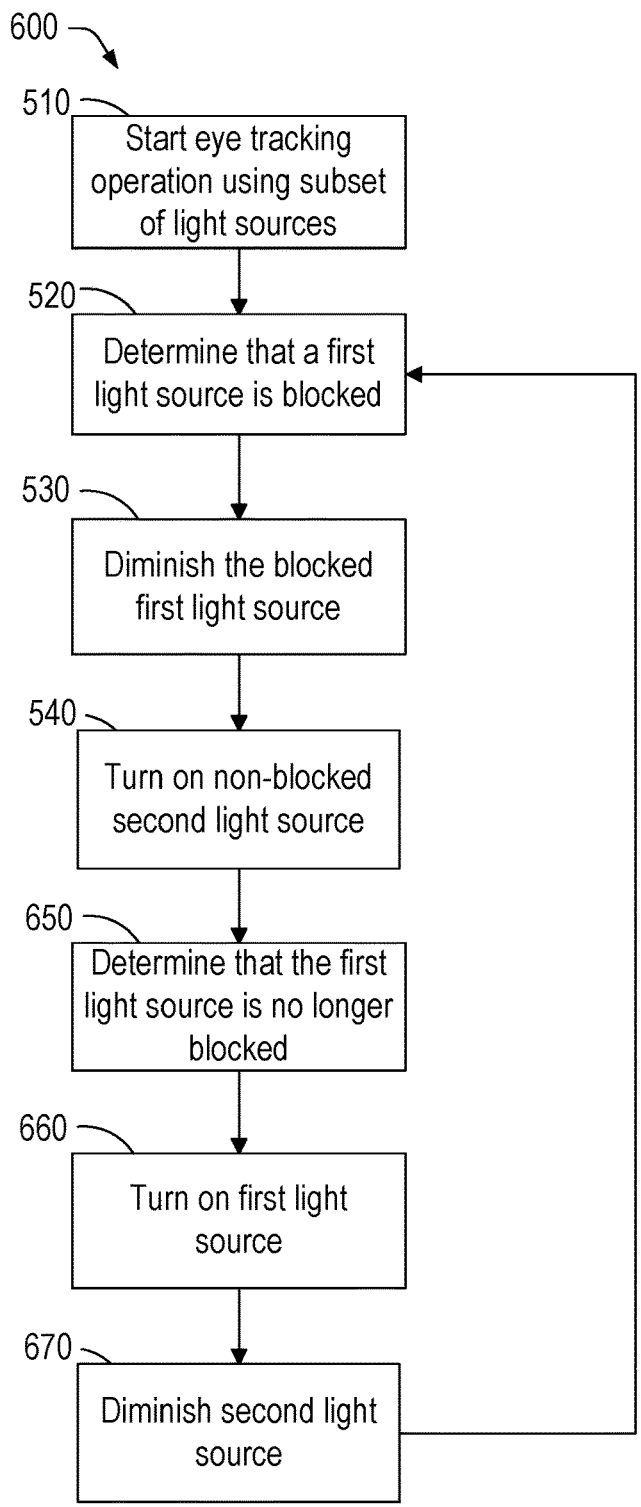
FIG. 6 is a flowchart of an example process of dynamic LED operation, according to some example embodiments.

FIG. 6 is a flowchart of an example method of dynamic LED operation, according to some example embodiments. Operations 510-670 of the process 600 are described as being performed by the components or modules shown in FIG. 2, by way of example and not limitation. Operations 510-540 of the process 600 are described above with respect to FIG. 5.

In operation 650, the dynamic control module 210 determines that a blocked light is no longer blocked. In response to that determination, the formerly blocked light is re-enabled (operation 660) and its substitute is turned off (operation 670). This may reflect the unblocking of a higher-priority light. For example, if the highest-priority light configuration is having L3 and L4 on, then when either L3 or L4 is blocked (detected in operation 520), a different light configuration would be used (set in operations 530 and 540). Then, if L3 becomes unblocked, L3 would be re-enabled and the substitute light for L3 disabled or diminished (operations 650-670). The process of monitoring for blocked or unblocked lights may continue during operation of the device, represented in FIG. 6 by the control flow returning to operation 520 after operation 670 is complete.

The unblocking of a light source may be determined by a proximity sensor. For example, if the user's thumb were detected as blocking the light L3 by a proximity sensor near the light L3, the proximity sensor may later determine that the thumb has been removed and that the light has been unblocked.

In some example embodiments, the unblocking of a diminished light source is determined through image analysis. For example, if the light L3 were diminished by reducing its strobe frequency, glints generated by the light L3 reflecting off of the eye would reappear in sync with the reduced strobe frequency once the light L3 was no longer blocked. Accordingly, when the glints reappear, the strobe frequency of the light L3 can be restored to its normal value (e.g., in operation 660).

Figure 7:
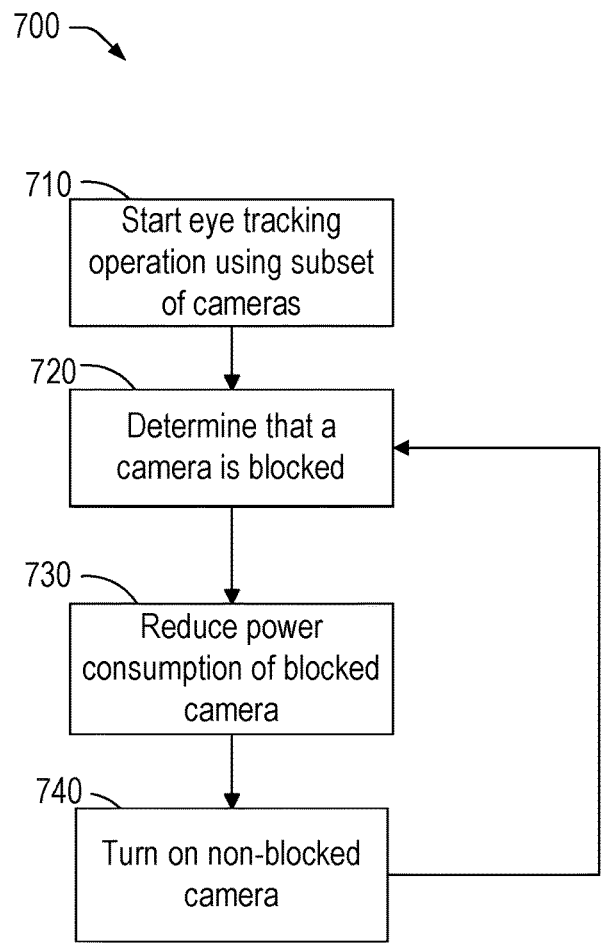
FIG. 7 is a flowchart of an example process of dynamic camera operation, according to some example embodiments.

FIG. 7 is a flowchart of an example process 700 of dynamic camera operation, according to some example embodiments. Operations 710-740 of the process 700 are described as being performed by the components or modules shown in FIG. 2, by way of example and not limitation.

In operation 710, eye tracking is begun using a subset of the cameras on a device. For example, the device of FIG. 1 may have the camera C above the screen enabled by the camera module 218 and a second camera C2 below the screen (not shown) disabled when eye tracking begins.

During use of the device, the dynamic control module 210 may detect that one of the enabled cameras is blocked, in operation 720. For example, the user holding the device 100 may place a thumb over C, detected by a proximity sensor in the device immediately adjacent to C. As another example, detection of the blocked camera may be performed by comparing two images captured by C. When a first image captured by C shows an eye of the user and a second image captured by C does not, the system may conclude that the camera C has been blocked.

The dynamic control module 210, in operation 730, reduces power consumption of the blocked camera. Continuing with this example, the camera C is turned off. Turning off the camera may reduce power consumption, reduce heat generation, reduce CPU usage, or any combination thereof. In some example embodiments, blocked cameras are not turned off completely, but are configured to a low-power mode, such as stand-by, or set to capture images at a lower resolution and frame rate, thereby making a transition to an ON state faster.

In operation 740, the dynamic control module 210 activates a non-blocked camera. The available cameras may be prioritized as substitutes for each other. For example, C may have C2 as a first substitute, and a third camera, C3 (not shown), as a second substitute. In this case, C2 would be enabled for C, unless C2 was also blocked.

In some example embodiments, cameras are treated in pairs or larger sets. The methods described above with respect to paired lights in FIG. 5 may also be used for cameras.

The process of monitoring for blocked cameras may continue during operation of the device, represented in FIG. 7 by the control flow returning to operation 720 after operation 740 is complete.

Figure 8:
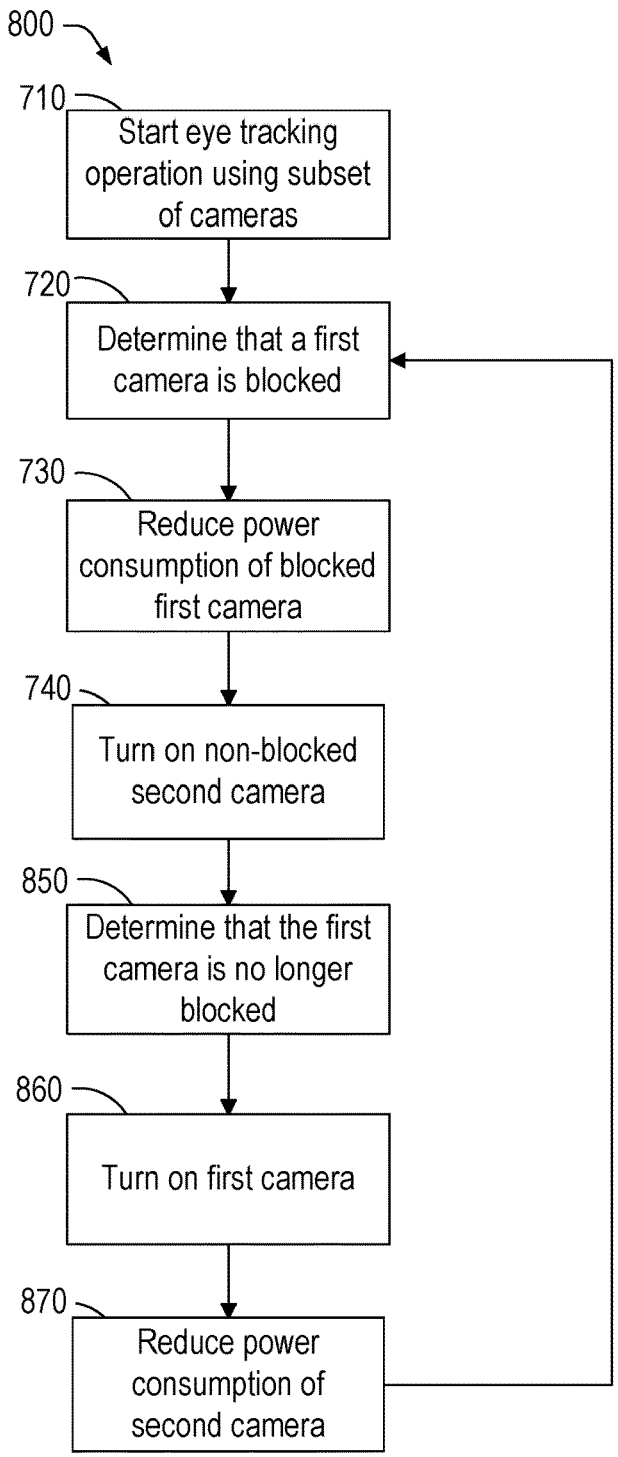
FIG. 8 is a flowchart of an example process of dynamic camera operation, according to some example embodiments.

FIG. 8 is a flowchart of an example process 800 of dynamic camera operation, according to some example embodiments. Operations 710-870 of the process 800 are described as being performed by the components or modules shown in FIG. 2, by way of example and not limitation. Operations 710-740 of the process 800 are described above with respect to FIG. 7.

In operation 850, the dynamic control module 210 determines that a blocked camera is no longer blocked. In response to that determination, the formerly blocked camera is re-enabled (operation 860) and its substitute is turned off or otherwise placed in a low-power mode (operation 870). This may reflect the unblocking of a higher-priority camera. For example, if the highest-priority camera is C, then when C is blocked (detected in operation 720), a different camera configuration would be used (set in operations 730 and 740). Then, if C becomes unblocked (e.g., detected by a proximity sensor near C), C would be re-enabled and the substitute camera for C disabled (operations 850-870). The process of monitoring for blocked or unblocked cameras may continue during operation of the device, represented in FIG. 8 by the control flow returning to operation 720 after operation 870 is complete.

A camera may be blocked due to the orientation of the user with respect to said camera. For instance, the user may rotate his or her head, and a camera may not have a line of sight to the user's eyes (e.g. the view may be blocked by the user's eyelids). The system may detect this situation on the image or images provided by the one or more cameras, and may in response turn off said camera and turn on a different camera that has a better orientation with respect to the user. For example, if a camera on the right side of a device is blocked, a camera on the left side of the device may be activated.

The methods and systems described herein may provide advantages over existing methods and systems. For example, dynamic control of cameras and light sources may allow for an eye tracking session to continue even if a light source or a camera is blocked, by detecting when the component is blocked (e.g. by the user's hand or thumb when interacting with a touch screen) and seamlessly switching to a different component. As another example, determining that not enough non-blocked components are available allows for automatic shutdown of eye tracking functionality, thereby reducing battery consumption. As yet another example, using the optimal combination of components from the ones available (i.e., non-blocked) may improve eye tracking quality as well as gaze estimation accuracy.

Certain example embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various example embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In example embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other example embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In example embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
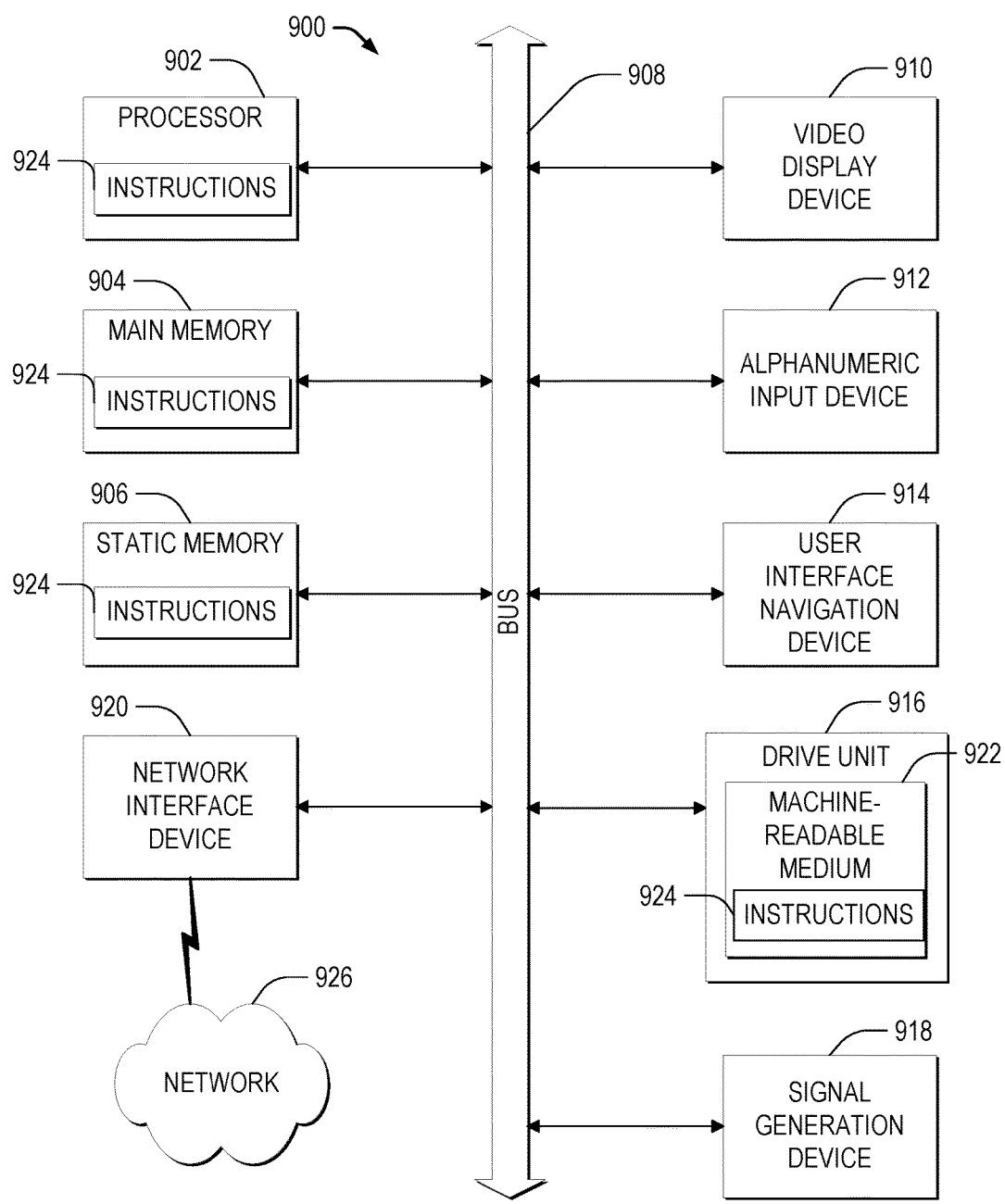
FIG. 9 is a block diagram of a machine in the example form of a computer system within which a set of instructions, for causing the machine to perform any one or more of the methodologies discussed herein, may be executed, according to some example embodiments.

FIG. 9 is a block diagram of a machine in the example form of a computer system 900 within which instructions, for causing the machine to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 900 includes a processor 902 (e.g., a CPU, a GPU, or both), a main memory 904, and a static memory 906, which communicate with each other via a bus 908. Computer system 900 may further include a video display device 910 (e.g., a liquid crystal display (LCD) or a cathode ray tube (CRT)). Computer system 900 also includes an alphanumeric input device 912 (e.g., a keyboard), a user interface (UI) navigation device 914 (e.g., a mouse or touch sensitive display), a disk drive unit 916, a signal generation device 918 (e.g., a speaker), and a network interface device 920.

Disk drive unit 916 includes a machine-readable medium 922 on which is stored one or more sets of instructions and data structures (e.g., software) 924 embodying or utilized by any one or more of the methodologies or functions described herein. Instructions 924 may also reside, completely or at least partially, within main memory 904, within static memory 906, or within processor 902 during execution thereof by computer system 900, with main memory 904 and processor 902 also constituting machine-readable media.

While machine-readable medium 922 is shown in an example embodiment to be a single medium, the term "machine-readable medium" may include a single medium or multiple media (e.g., a centralized or distributed database, or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present technology, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 924 may further be transmitted or received over a communications network 926 using a transmission medium. Instructions 924 may be transmitted using network interface device 920 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The example embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising:
   a set of light sources;
   a set of cameras; and
   a processor operatively coupled to the set of light sources and configured to perform operations comprising:
      activating a subset of the set of light sources, the subset being smaller than the set, the activated subset of light sources strobed at a first strobe frequency;
      determining that light emitted from a first light source is not reaching an eye of a user, the first light source being in the activated subset of light sources;
      based on the determination, reducing an amount of light emitted from the first light source and activating a second light source of the set of light sources, the second light source not being in the activated subset of light sources, wherein reducing the amount of light emitted from the first light source comprises strobing the first light source at a second strobe frequency, the second strobe frequency less than the first strobe frequency;
      detecting the second strobe frequency in images captured by at least one of the cameras; and
      responsive to detecting the second strobe frequency, strobing the first light source at the first strobe frequency.

2. The system of claim 1, wherein the determination that the light emitted from the first light source is not reaching the eye of the user is based on a proximity sensor near the first light source.

3. The system of claim 1, wherein the determining that the light emitted from the first light source is not reaching the eye of the user comprises:
   comparing a first image of the eye of the user with a second image of the eye of the user; and
   based on the comparison, determining that a reflection from the first light source in the activated subset of light sources is present in the first image and is absent in the second image.

4. The system of claim 1, wherein the reducing of the amount of light emitted from the first light source further comprises deactivating the first light source.

5. The system of claim 1, wherein the reducing of the amount of light emitted from the first light source further comprises reducing an intensity of the first light source.

6. The system of claim 1, wherein the operations further comprise:
   responsive to detecting the second strobe frequency, reducing an amount of light emitted from the second light source.

7. A method comprising:
   activating a subset of a set of light sources, the subset being smaller than the set, the activated subset of light sources strobed at a first strobe frequency;
   comparing a first image of an eye of a user with a second image of the eye of the user;
   based on the comparison, determining that a reflection from a first light source in the activated subset of light sources is present in the first image and is absent in the second image;
   based on the determination and by a processor of a machine, reducing an amount of light emitted from the first light source and activating a second light source of the set of light sources, the second light source not being in the activated subset of light sources, wherein reducing the amount of light emitted from the first light source comprises strobing the first light source at a second strobe frequency, the second strobe frequency less than the first strobe frequency;
   detecting the second strobe frequency in images captured by at least one of the cameras; and
   responsive to detecting the second strobe frequency, strobing the first light source at the first strobe frequency.

8. The method of claim 7, wherein the reducing of the amount of light emitted from the first light source further comprises deactivating the first light source.

9. The method of claim 7, wherein the reducing of the amount of light emitted from the first light source further comprises reducing an intensity of the first light source.

10. The method of claim 7, further comprising:
    identifying the second light source based on the first light source.

11. The method of claim 7, further comprising:
    responsive to detecting the second strobe frequency, reducing an amount of light emitted from the second light source and restoring the first light source.

12. A non-transitory machine-readable storage medium storing instructions which, when executed by one or more processors, cause the one or more processors to perform operations comprising:
    activating a subset of a set of light sources, the subset being smaller than the set, the activated subset of light sources strobed at a first strobe frequency;
    determining that a reflection of light from a first light source in the activated subset of light sources is not reaching a camera;
    based on the determination, reducing an amount of light emitted from the first light source and activating a second light source of the set of light sources, the second light sources not being in the activated subset of light sources, wherein reducing the amount of light emitted from the first light source comprises strobing the first light source at a second strobe frequency, the second strobe frequency less than the first strobe frequency;
    detecting the second strobe frequency in images captured by the camera; and
    responsive to detecting the second strobe frequency, strobing the first light source at the first strobe frequency.

13. The machine-readable storage medium of claim 12, wherein reducing the amount of light emitted from the first light source comprises deactivating the first the first light source.

14. The machine-readable storage medium of claim 12, wherein determining that a reflection of light from the first light source is not reaching the camera comprises:
    comparing a first image of the eye of the user with a second image of the eye of the user; and
    based on the comparison, determining that a reflection from the first light source in the activated subset of light sources is present in the first image and is absent in the second image.

15. The machine-readable storage medium of claim 12, wherein the determination that the reflection of light from the light source is not reaching the first camera is based on a proximity sensor near the light source.

16. The machine-readable storage medium of claim 12, wherein the determining that the light from the first light source is not reaching the camera comprises:
    comparing a first image taken by the camera with a second image taken by the camera; and based on the comparison, determining that an eye of a user is present in the first image and is absent in the second image.

17. The system of claim 1, wherein the operations further comprise:
   computing a priority for each of the light sources; and
   selecting, as the second light source, a light source having a highest priority of the light sources not in the activated subset of light sources.

18. The system of claim 17, wherein the operations further comprise:
   responsive to detecting that a device housing the set of light sources has been rotated, updating the priority of each of the light sources.

* * * * *

UNITED STATES PATENT AND TRADEMARK OFFICE
CERTIFICATE OF CORRECTION

Page 1 of 1

PATENT NO. : 10,156,899 B2
APPLICATION NO. : 14/990448
DATED : December 18, 2018
INVENTOR(S) : Javier San Agustin Lopez It is certified that error appears in the above-identified patent and that said Letters Patent is hereby corrected as shown below:

In the Claims

Column 14, Line 3 of Claim 13, delete "the first"

Signed and Sealed this
Ninth Day of July, 2019

Andrei Iancu
*Director of the United States Patent and Trademark Office*